United States Patent
Czorny et al.

(10) Patent No.: US 12,519,165 B2
(45) Date of Patent: Jan. 6, 2026

(54) ONE-PIECE BATTERY CARRIER AND METHOD FOR DIE CASTING A ONE-PIECE BATTERY CARRIER

(71) Applicant: Nemak, S.A.B. de C.V., Nuevo Leon (MX)

(72) Inventors: Lucjan Czorny, Czechowice-Dziedzice (PL); Stefan Heueis, Oberursel (DE); Sascha Florian List, Idstein (DE); Jan Scheil, Wiesbaden (DE); Andreas Müller, Rüsselsheim (DE)

(73) Assignee: Nemak, S.A.B. de C.V., Nuevo Leon (MX)

( * ) Notice: Subject to any disclaimer, the term of this patent is extended or adjusted under 35 U.S.C. 154(b) by 0 days.

(21) Appl. No.: 18/854,227

(22) PCT Filed: Apr. 3, 2023

(86) PCT No.: PCT/IB2023/053334
§ 371 (c)(1),
(2) Date: Oct. 4, 2024

(87) PCT Pub. No.: WO2023/194869
PCT Pub. Date: Oct. 12, 2023

(65) Prior Publication Data
US 2025/0233246 A1    Jul. 17, 2025

(30) Foreign Application Priority Data
Apr. 6, 2022 (EP) .................................... 22166955

(51) Int. Cl.
*B60K 1/04* (2019.01)
*H01M 10/613* (2014.01)
(Continued)

(52) U.S. Cl.
CPC ............. *H01M 50/242* (2021.01); *B60K 1/04* (2013.01); *H01M 10/613* (2015.04);
(Continued)

(58) Field of Classification Search
CPC ............. H01M 50/242; H01M 50/204; H01M 50/224; H01M 50/262; H01M 2220/20;
(Continued)

(56) References Cited

U.S. PATENT DOCUMENTS

2021/0408623 A1* 12/2021 Menzl ............... H01M 10/6556
2024/0313324 A1* 9/2024 Hofer .................. H01M 10/613

FOREIGN PATENT DOCUMENTS

CN          1876277 A      12/2006
CN        107768562 A       3/2018
(Continued)

*Primary Examiner* — Jason D Shanske
*Assistant Examiner* — James J Triggs
(74) *Attorney, Agent, or Firm* — The Webb Law Firm

(57) ABSTRACT

A battery carrier for receiving at least one battery module serving as a drive energy storage device for an electrically driven vehicle. The battery carrier can be connected to a body of the vehicle, including a substantially circumferential frame structure having longitudinal sides and transverse sides for forming a receiving area for the at least one battery module, wherein the battery carrier is integrally molded from a light metal material, in particular integrally cast from a light metal material. The receiving area encloses an area of at least 0.5 m2, in particular of at least 0.75 m2, particularly preferably of at least 1 m2. The present invention also relates to methods for die casting a substantially one-piece battery carrier from a light metal melt, in particular from an aluminum alloy melt.

20 Claims, 9 Drawing Sheets

(51) Int. Cl.
  *H01M 10/625* (2014.01)
  *H01M 10/6554* (2014.01)
  *H01M 10/6556* (2014.01)
  *H01M 50/204* (2021.01)
  *H01M 50/224* (2021.01)
  *H01M 50/242* (2021.01)
  *H01M 50/249* (2021.01)
  *H01M 50/262* (2021.01)

(52) U.S. Cl.
  CPC ..... *H01M 10/625* (2015.04); *H01M 10/6554* (2015.04); *H01M 10/6556* (2015.04); *H01M 50/204* (2021.01); *H01M 50/224* (2021.01); *H01M 50/249* (2021.01); *H01M 50/262* (2021.01); *H01M 2220/20* (2013.01)

(58) Field of Classification Search
  CPC ........... H01M 10/625; H01M 10/6554; H01M 10/613; B60K 1/04
  See application file for complete search history.

(56) References Cited

FOREIGN PATENT DOCUMENTS

| | | |
|---|---|---|
| CN | 111525054 A | 8/2020 |
| DE | 102016115611 B3 | 2/2018 |
| DE | 102016115627 A1 | 3/2018 |
| DE | 102018210124 A1 | 12/2019 |
| DE | 102019102754 A1 | 8/2020 |
| DE | 2021003299 A1 | 1/2021 |
| WO | 2021003299 A1 | 1/2021 |

* cited by examiner

ONE-PIECE BATTERY CARRIER AND METHOD FOR DIE CASTING A ONE-PIECE BATTERY CARRIER

CROSS-REFERENCE TO RELATED APPLICATIONS

This application is the United States national phase of International Application No. PCT/IB2023/053334 filed Apr. 3, 2023, and claims priority to European Patent Application No. 22166955.9 filed Apr. 6, 2022, the disclosures of which are hereby incorporated by reference in their entireties.

BACKGROUND OF THE INVENTION

Field of the Invention

The present invention relates to a battery carrier for accommodating at least one battery module serving as a drive energy storage device for an electrically driven vehicle, wherein the battery carrier can be connected to a body of the vehicle, comprising: a substantially circumferential frame structure having longitudinal sides and transverse sides. The present invention also relates to a method for die casting a substantially one-piece battery carrier, in particular a battery carrier as described herein, from a light metal melt, in particular from an aluminum alloy melt.

Electrically powered vehicles of the type in question here generally carry a plurality of battery modules comprising battery cells, which serve as drive energy storage devices and provide the electrical energy required for driving. In particular, an electrically powered vehicle of the type in question here is an electric car which is essentially driven exclusively by an electric motor or several electric motors. Alternatively, the aforementioned battery carrier can also be used in a hybrid vehicle, which has an internal combustion engine in addition to an electric motor.

As battery modules regularly have a high weight, their placement in the vehicle not only places high demands on the vehicle's supporting structure from a static point of view, but also influences the dynamic forces that occur during driving.

With regard to driving behavior, positioning the individual battery modules in the base area of the vehicle has proven to be expedient. To make this possible, battery carriers have been proposed that are essentially flat and plate-like. Such battery carriers can be arranged in the base area of the vehicle and connected to the vehicle body.

Considerable demands are therefore placed on the static and dynamic load-bearing capacity of the battery carriers described above. The battery carrier should not only be able to carry the individual battery modules, but also absorb the dynamic loads that arise when the vehicle is in motion. The battery carrier should also provide the best possible protection for the highly flammable battery modules in the event of an accident.

Description of Related Art

Battery carriers are therefore a crucial component for the safety and functionality of vehicles. Such requirements for the manufacture of battery carriers sometimes lead to the use of complex geometries for the battery carriers. Due to the complex geometries of the battery carriers, manufacturing methods are used in which several components have to be joined together in a complex manner, in particular welded together. Such manufacturing methods lead to increased costs in the production of the battery carriers and, in addition, the connection points are often to be regarded as weak points in terms of mechanical load capacity and impermeability to penetration by external media of the battery carriers.

In addition to the aforementioned aspects, the aim is also to reduce the weight of the battery carriers in question. This presents a further challenge, as the aforementioned requirements for the static and dynamic load-bearing capacity of battery carriers are to be met despite a reduction in weight.

Against this background, the task has arisen of providing a battery carrier of the aforementioned type, which has advantageous static and dynamic properties as well as a low weight and can also be manufactured cost-effectively. Furthermore, a method for manufacturing a battery carrier is to be provided which enables a lightweight battery carrier with advantageous static and dynamic properties to be manufactured at low cost.

SUMMARY OF THE INVENTION

In accordance with a first aspect of the present invention, the aforementioned task is solved in a battery carrier for accommodating at least one battery module serving as a drive energy storage device for an electrically driven vehicle, wherein the battery carrier can be connected to a body of the vehicle, in that the battery carrier comprises a circumferential frame structure having longitudinal sides and transverse sides for forming a receiving area for the at least one battery module, wherein the battery carrier is formed in one piece from a light metal material, in particular is cast in one piece from a light metal material, and wherein the receiving area encloses an area of at least $0.5 \text{ m}^2$, in particular of at least $0.75 \text{ m}^2$, particularly preferably of at least $1 \text{ m}^2$.

Due to the one-piece design of the battery carrier, a battery carrier can be produced in a cost-effective manner, preferably by a die casting method, which is inexpensive to manufacture and also has advantageous static and dynamic properties. Surprisingly, it has been shown that a battery carrier with a relatively large mounting area, which is required in particular for mounting battery modules of a purely electrically powered vehicle, can also be manufactured in one piece. On the one hand, the one-piece production of such a battery carrier eliminates certain production steps, as individual components of the battery carrier do not have to be subsequently connected to each other, and on the other hand, vulnerable connection areas of the battery carrier can be avoided. A battery carrier of this type has particularly advantageous properties in terms of bending stiffness and torsional rigidity. In addition, due to its one-piece nature, the battery carrier offers advantageous properties for compliance with required tolerances, for achieving tightness requirements and for the ratio of the weight of the battery carrier to the available surface area for battery cells. In the present case, a one-piece battery carrier can be a one-part battery carrier. In particular, the battery carrier according to the invention can provide an advantageous ratio between the space for battery modules to be accommodated and the weight of the battery carrier itself.

In a preferred embodiment, the battery carrier has a weight in a range of less than 70 kg, in particular in a range of less than 60 kg, especially preferably in a range of less than 50 kg. This enables further optimization of the ratio between the weight of the battery carrier and the space for battery modules to be accommodated. In particular, the battery carrier or the receiving area of the battery carrier has a receiving area of more than 2 m$^2$, preferably more than 2.1 m$^2$, particularly preferably more than 2.2 m$^2$, for holding battery modules.

The area enclosed by the mounting area is preferably the area which, when the battery carrier is installed in a vehicle, runs essentially horizontally between the surrounding frame structure and through which at least one battery module can therefore be accommodated. In particular, the surface of the receiving area is enclosed by the circumferential frame structure, the surface of the receiving area preferably being bounded by the inner side surfaces of the longitudinal sides and by the inner side surfaces of the transverse sides of the circumferential frame structure and thus extending in particular within the inner side surfaces of the longitudinal sides and the transverse sides of the frame structure.

Furthermore, it is preferred that the receiving area encloses an area of at least 1.25 m$^2$, preferably of at least 1.5 m$^2$, in particular of at least 1.75 m$^2$, particularly preferably of at least 2 m$^2$. For example, the longitudinal sides have a length of more than 1 m, in particular more than 1.2 m, especially preferably more than 1.5 m and/or the transverse sides have a length of more than 1 m, in particular more than 1.25 m, especially preferably more than 1.4 m.

Preferably, the circumferential frame structure is essentially rectangular, with the longitudinal sides each running essentially parallel to one another and/or with the transverse sides running essentially parallel to one another.

Furthermore, it is preferred that the frame structure has transition areas between the longitudinal sides and at least one transverse side. The provision of such transition areas can be advantageous depending on the respective installation situation as well as with regard to the crash properties of the battery carrier. The transition areas can, for example, be designed as curved sections of the frame structure that connect the longitudinal sides and at least one transverse side. In particular, the transition areas can also run in the form of a circular arc. Alternatively, the transition areas of the frame structure can also be designed to be essentially straight, with the inside of the transition areas forming an angle of less than 180° with the inside of the longitudinal sides and/or the inside of the at least one transverse side. By providing transition areas, the tightness requirements of the battery carrier provided can also be improved. This is because, in particular, the transition areas prevent a large number of edges that normally meet and have to be sealed to each other from meeting.

A preferred embodiment of the present invention is characterized in that the battery carrier has at least one transverse web and/or at least one longitudinal web for stiffening the battery carrier and/or for connecting the battery carrier to the body of the vehicle. By providing at least one transverse web and/or at least one longitudinal web, the battery carrier can be further reinforced in terms of its static and dynamic properties. Likewise, the at least one transverse web and/or the at least one longitudinal web can be used to connect the battery carrier to the body of a vehicle. In particular, the at least one transverse web and/or the at least one longitudinal web can be used to provide sections within the frame structure of the battery carrier that can be used to accommodate individual battery modules.

It is also preferred that the at least one transverse web runs essentially parallel to at least one transverse side of the frame structure and/or the at least one longitudinal web runs essentially parallel to at least one longitudinal side of the frame structure. This enables an advantageous arrangement of the battery carrier in the vehicle as well as a space-optimized accommodation of battery modules commonly used in practice in the accommodation area of the battery carrier.

According to a further advantageous embodiment of the invention, at least two ribs, in particular arranged essentially next to one another, form the at least one transverse web and/or the at least one longitudinal web. By providing two ribs to form at least one transverse web and/or at least one longitudinal web, the rigidity of the battery carrier can be further improved.

In this regard, it is further preferred that the at least two ribs are arranged relative to one another such that the transverse web and/or the longitudinal web has a plurality of substantially O-shaped rib structures, preferably a plurality of O-shaped rib structures arranged substantially in a row. By the two ribs having the aforementioned arrangement, the production of the at least one transverse web and/or the at least one longitudinal web can be improved, particularly in terms of casting technology. Preferably, the rib structures are formed in the form of several elongated O-shaped rib structures arranged one behind the other. To improve the static and dynamic properties of the battery carrier provided by the rib structures, it is advantageous to connect the individual O-shaped rib structures centrally with a web extending essentially orthogonally to the longitudinal extension of the rib structures.

A further advantageous embodiment of the invention is characterized in that at least one connecting section for connecting the battery carrier to the body of the vehicle is arranged in an intersection area of the at least one transverse web with the at least one longitudinal web. Such positioning is advantageous from a manufacturing point of view, in particular from a casting point of view, whereby a particularly stable connection to the body of the vehicle can also be provided. Preferably, the at least one connecting section is essentially cylindrical in shape.

In a further preferred embodiment of the invention, the height of the at least one transverse web varies along the longitudinal extent of the at least one transverse web and/or the height of the at least one longitudinal web varies along the longitudinal extent of the at least one longitudinal web. In this way, the height of the at least one transverse web and/or the at least one longitudinal web required at the respective location to improve the properties or to connect the battery carrier to the body can be provided. This makes it possible to reduce the overall material used and the weight of the battery carrier. The height of the at least one transverse web and/or of the at least one longitudinal web preferably refers to the extension of the at least one transverse web and/or of the at least one longitudinal web essentially orthogonally to the direction of extension of the at least one transverse web and/or of the at least one longitudinal web.

A further preferred embodiment of the invention is characterized in that the at least one transverse web and/or the at least one longitudinal web has connecting sections for connecting the battery carrier to the body of the vehicle, and in that the height of the at least one transverse web and/or the at least one longitudinal web in the connecting sections is substantially maximum and/or in that the height of the at least one transverse web and/or the at least one longitudinal web is substantially minimum in the middle between the connecting sections. In this way, optimized transverse webs and/or longitudinal webs can be provided in terms of casting technology, which have sufficient strength and rigidity with a reduction in the material required at the connecting sections. The height of the at least one transverse web and/or of the at least one longitudinal web preferably refers to the extension of the at least one transverse web and/or of the at least one longitudinal web substantially orthogonal to the direction of extension of the at least one transverse web and/or of the at least one longitudinal web.

A further preferred embodiment of the invention is characterized in that the outer side of the circumferential frame structure at least partially comprises a profile structure for stiffening the battery carrier. Preferably, the profile structure comprises substantially horizontally extending profile webs and/or substantially vertically extending profile webs. Preferably, the substantially horizontally and/or vertically extending profile webs essentially form a box profile or a honeycomb profile. By providing a profile structure, crash structures can be created in particular, which absorb any forces arising in the event of a vehicle accident and protect the battery modules arranged in the battery carrier. In particular, the design of the profile structure as a box profile or honeycomb profile has proven to be advantageous in terms of casting production. These crash structures are preferably represented by "sliders" in the die casting method.

In a further advantageous embodiment of the invention, the length of the essentially horizontally extending profile webs and/or the length of the essentially vertically extending profile webs varies. This enables an adapted profile structure so that the frame structure can be stiffened to a greater or lesser extent as required. This allows the crash properties of the profile structure to be further optimized and the overall weight of the battery carrier to be reduced.

A further preferred embodiment is characterized by the fact that the battery carrier is cast in one piece and that the profile structure has essentially vertical reinforcing webs, whereby the essentially vertical reinforcing webs are assigned to ejector markings of the circumferential frame structure. This enables targeted reinforcement of the frame structure at the ejector markings, as the areas of the circumferential frame structure assigned to the ejector markings regularly have reduced stability. At the same time, the ejector marks allow the frame structure to be easily removed from the casting tool.

In a further advantageous embodiment of the invention, the battery carrier further comprises a base. This allows the individual battery modules to be reliably arranged in the battery carrier. In addition, this can prevent damage to the battery modules due to external influences, in particular against stone chipping and moisture. It is preferable that the base has cooling channels for cooling the battery modules held in the battery carrier. By providing cooling channels, the battery carrier can already provide reliable cooling without the need for costly retrofitting. Furthermore, it is preferable that the base is formed in one piece with the battery carrier as a component of the battery carrier, in particular cast. By providing a base, the tightness provided by the battery carrier can be further improved.

In an advantageous embodiment of the invention, the receiving area formed by the circumferential frame structure further comprises an area, in particular a separate area, for receiving at least one control means, in particular for receiving control electronics, for the at least one battery module. This enables a compact arrangement of the control electronics usually required for the at least one battery module within the battery carrier. Preferably, the circumferential frame structure, in particular the longitudinal sides and/or the transverse sides, has at least one opening for the electrical connection of the battery modules arranged in the battery carrier and/or the control electronics arranged in the battery carrier.

A further advantageous embodiment of the invention is characterized in that the circumferential frame structure, in particular a first transverse side of the circumferential frame structure, has at least one inlet and/or at least one outlet, preferably at least two outlets, and in that the at least one inlet and/or the at least one outlet are fluidically connected to the cooling channels arranged in the base for the circulation of coolant in the cooling channels. This enables a favorable connection of the battery carrier to a cooling circuit for cooling the battery modules arranged in the battery carrier from a design point of view.

In a further advantageous embodiment of the invention, a first transverse side has at least one inlet arranged substantially centrally and two outlets arranged laterally to the inlet, wherein cooling webs arranged in the base divide the cooling channels into at least a substantially first flow path and a substantially second flow path, wherein the first flow path is fluidically connected to the inlet and a first outlet, and that the second flow path is fluidically connected to the inlet and a second outlet. This makes it possible to provide cooling channels running from the center of the base, in particular from the center of the base of a transverse side of the battery carrier, which first run in a loop to the opposite side of the base and then flow back into the outlets arranged laterally next to the inlet. In particular, such a design of the cooling channels and the associated provision of at least two flow paths can provide advantageous cooling for the battery modules arranged in the battery carrier. In addition, the weight of the base of the battery carrier can be further reduced at the same time, which has a beneficial effect on the overall weight of the battery carrier. Such a design can also be implemented reliably in terms of casting technology.

A further preferred embodiment of the invention is characterized in that the first flow path and/or the second flow path has an inlet area extending from the inlet arranged on the first transverse side to essentially the second transverse side and an outlet area adjoining the inlet area and extending from the second transverse side to the first outlet and/or the second outlet, and in that preferably the inlet area comprises two inlet channels extending at least partially substantially parallel to one another and/or the outlet area comprises two outlet channels extending at least partially substantially parallel to one another. This makes it possible to optimize the cooling properties of the base of the battery carrier while using as little material as possible and thus reducing the weight of the battery carrier.

In a further advantageous embodiment of the invention, the battery carrier is cast in one piece from an aluminum alloy. In this context, it is preferred that the aluminum alloy is a cast aluminum alloy of the 4000 series, a cast aluminum alloy of the 5000 series or an aluminum alloy of the 7000 series. Furthermore, it is preferred that the aluminum alloy has the following composition in % by weight:

Mg 3.4 to 4.6;
Fe 1.3 to 1.7;
Si≤0.2;
Cu≤0.2;
Mn≤0.15;
Zn≤0.3;
Ti≤0.2; and
balance Al and unavoidable impurities; or
that the aluminum alloy has the following composition in % by weight:
Si 8.5 to 10.5;
Mn 0.3 to 0.6;
Fe≤0.15;
Cu≤0.05;

Mg≤0.1;
Zr≤0.3; preferably 0.1 to 0.3;
Zn≤0.05;
Ti≤0.15;
Sr≤0.03;
V≤0.1; and
balance Al and unavoidable impurities.

Such an aluminum alloy can also be an alloy with the designation AlSi6-11; AlMg2.5-14; AlZn2-6, AlSi9Mn or AlMg4Fe2. The aforementioned casting alloys are defined in the DIN EN 1706 standard, for example. It has been found in practice that the use of the aforementioned aluminum alloys results in a battery carrier with preferred static and dynamic properties, while at the same time providing a reduced weight.

According to a second aspect of the present invention, the aforementioned task is solved by a method for die casting a substantially one-piece battery carrier, in particular a battery carrier as described above, from a light metal melt, in particular from an aluminum alloy melt, comprising the following steps: Forming a mold cavity, at least two mold parts being moved to form the mold cavity in such a way that the at least two mold parts lie essentially sealed together, a blast area formed by the mold cavity preferably having at least 0.5 m$^2$, in particular at least 0.75 m$^2$, particularly preferably at least 1 m$^2$; filling the molten light metal into the mold cavity by means of a gating system, keeping the mold cavity closed with a closing force of at least 4000 metric tons, in particular of at least 5000 metric tons, especially preferably of at least 6000 metric tons until the molten light metal filled into the mold cavity has essentially solidified; opening the mold cavity and removing the battery carrier formed in the mold cavity.

In this way, a one-piece casting can be provided as part of a die casting method, which has a sufficiently large receiving area for receiving battery modules for electrically powered vehicles. Sufficiently large blast areas can also be provided by high closing forces, so that a casting can be produced which has a sufficiently large receiving area, for example for holding battery modules of an exclusively electrically powered vehicle.

The invention is based on the finding, surprising to those skilled in the art, that the aforementioned battery carrier can be produced in one piece by casting based on a die-casting method, although such a battery carrier requires a large receiving area and thus also a large blasting surface during casting production.

The blast area is, for example, the projected surfaces of the battery carrier, in particular including the overflows, the casting runner system and the casting chamber.

The above-described embodiments and exemplary embodiments of all aspects of the present invention, which in principle initially stand alone, are also to be understood as disclosed in all combinations with one another.

Further advantageous exemplary embodiments of the invention can be found in the following detailed description of some exemplary embodiments of the present invention, in particular in connection with the figures. However, the figures accompanying the application are intended only for the purpose of clarification and not for determining the scope of protection of the invention. The accompanying drawings are not necessarily to scale and are merely intended to reflect the general concept of the present invention by way of example. In particular, features contained in the figures are in no way to be considered a necessary part of the present invention.

BRIEF DESCRIPTION OF THE DRAWINGS

In the following, the invention is explained in more detail with reference to drawings showing examples of embodiments. They show schematically in each case.

DESCRIPTION OF THE INVENTION

Figure 1:
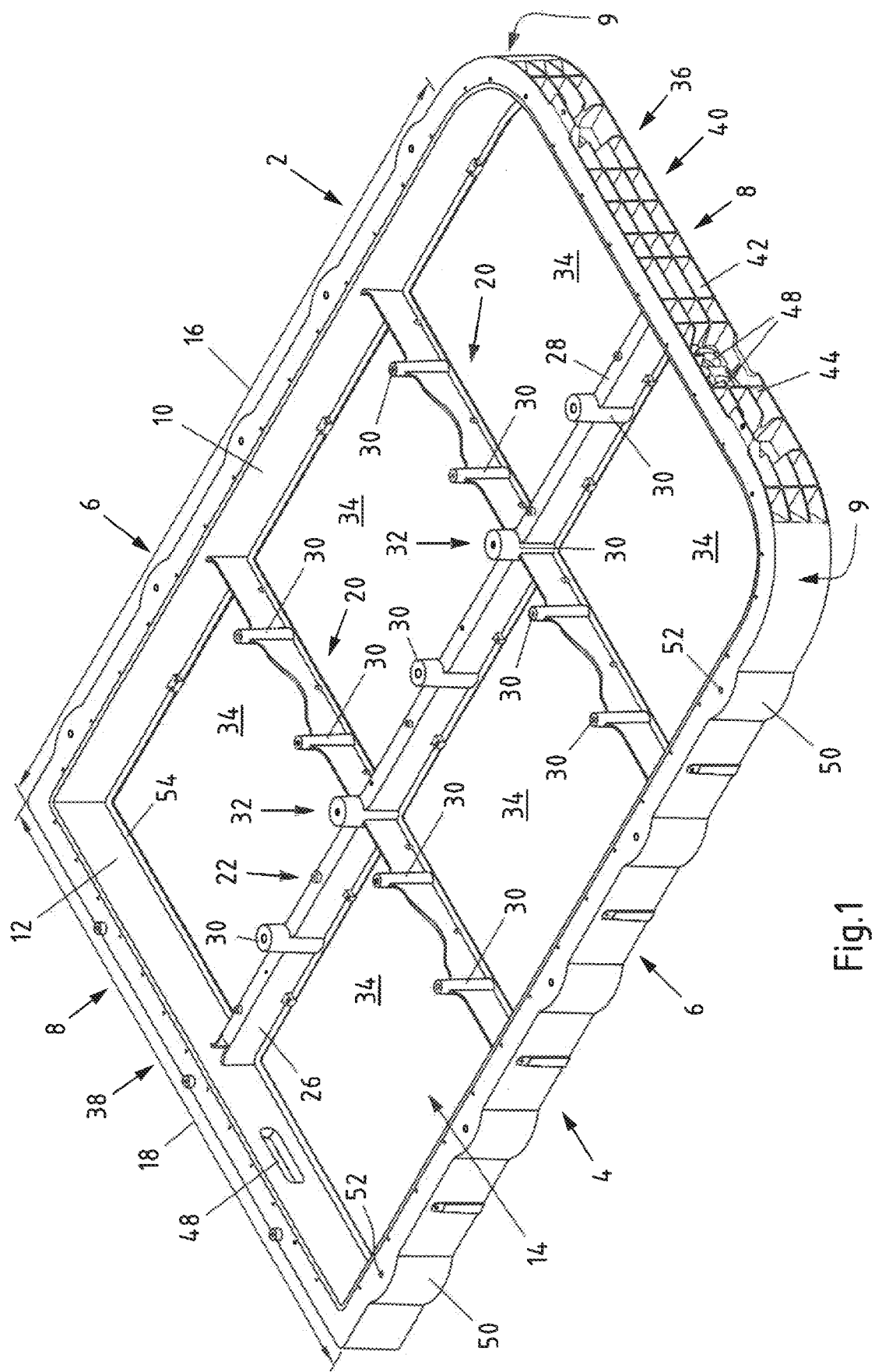
FIG. 1 a schematic view of an embodiment example of a battery carrier in a perspective view.
Figure 2:
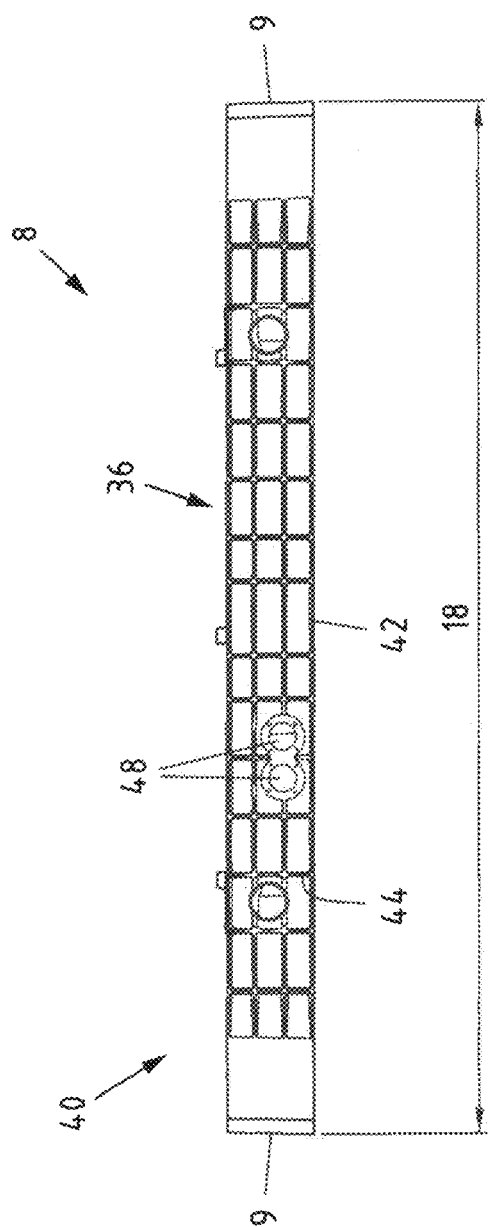
FIG. 2 a schematic front view of the embodiment example of a battery carrier shown in FIG. 1.
Figure 3:
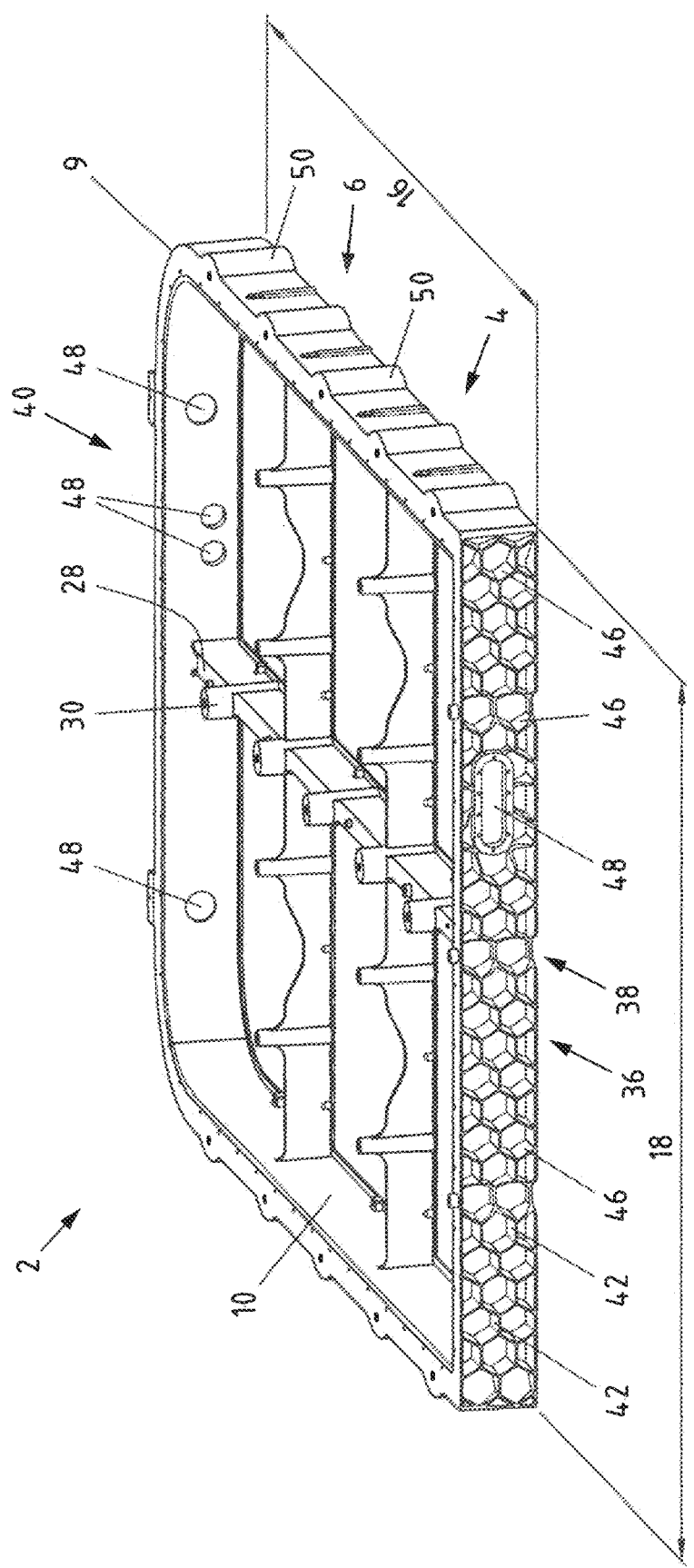
FIG. 3 a perspective rear view of the embodiment example of a battery carrier shown in FIG. 1.
Figure 4:
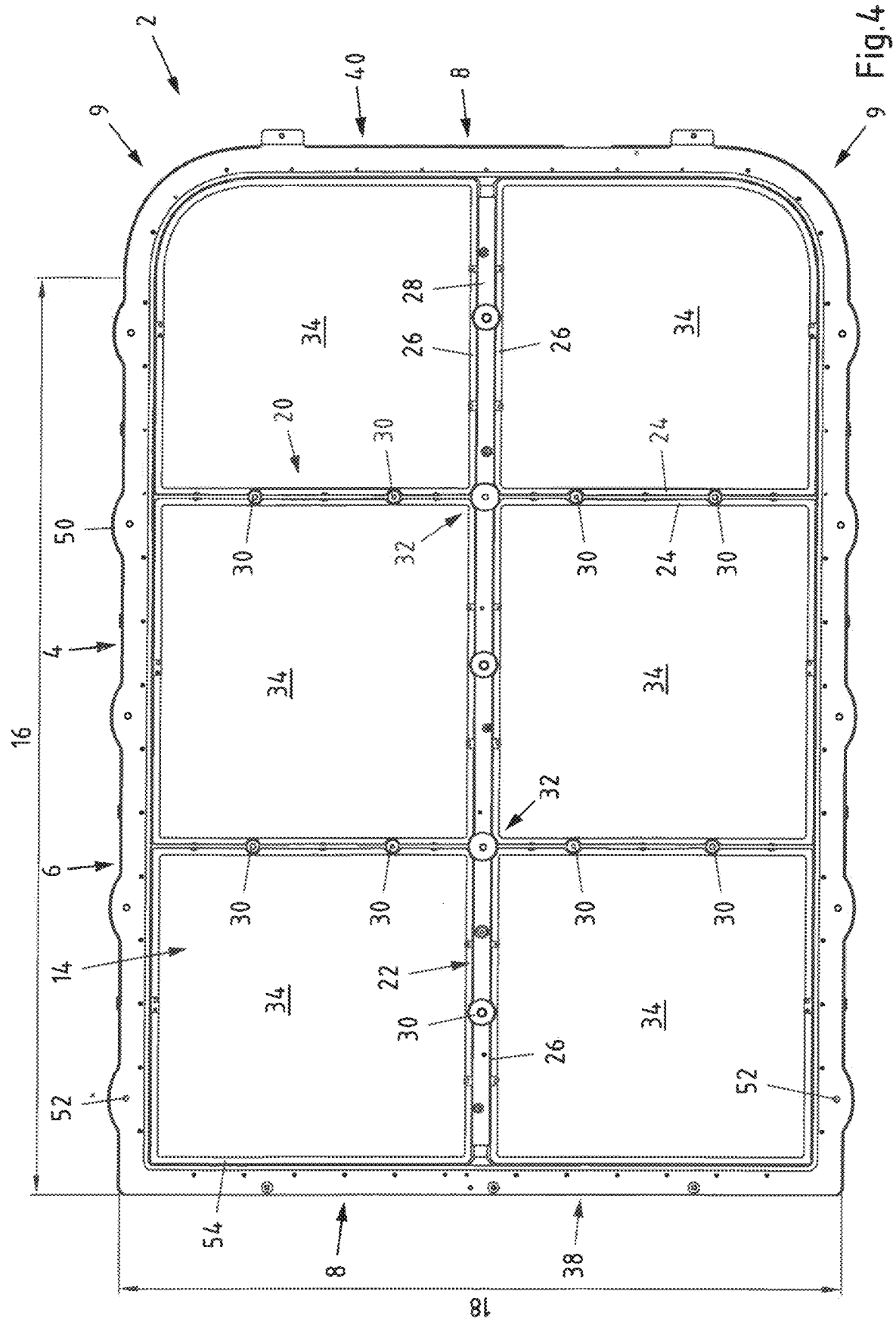
FIG. 4 a schematic top view of the embodiment example of a battery carrier shown in FIG. 1.
Figure 5:
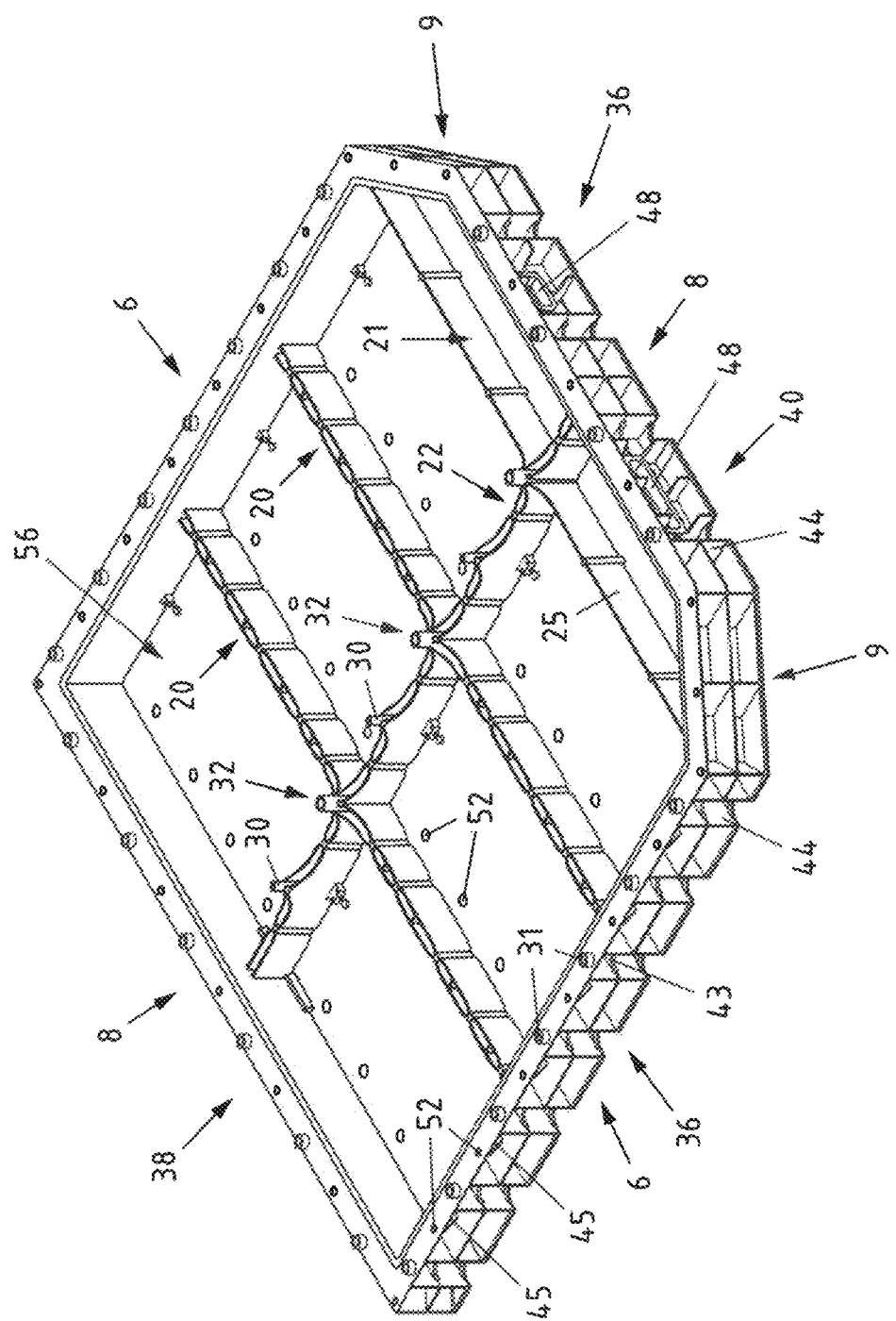
FIG. 5 a schematic view of a further embodiment example of a battery carrier in a perspective view.
Figure 6:
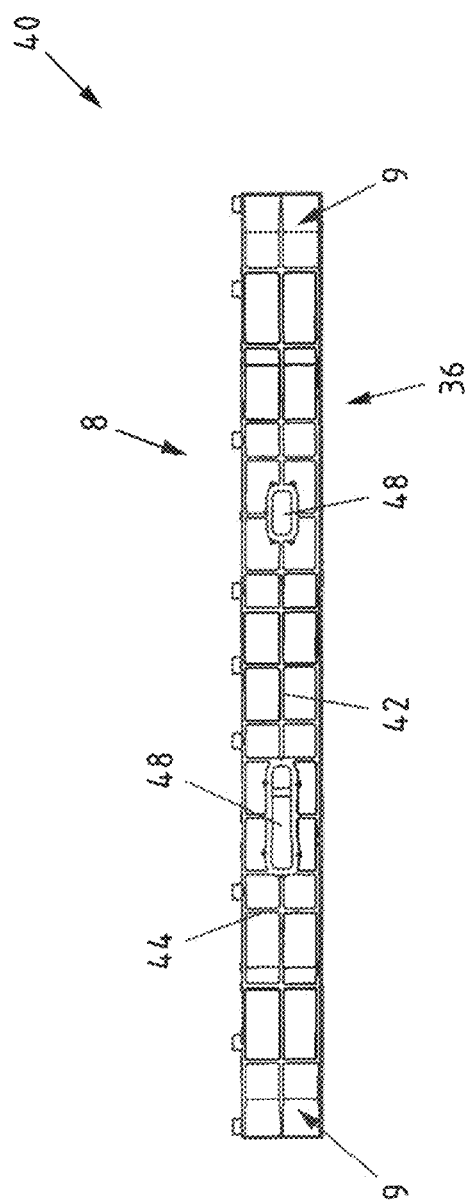
FIG. 6 a schematic front view of the further embodiment example of a battery carrier shown in FIG. 5.
Figure 7:
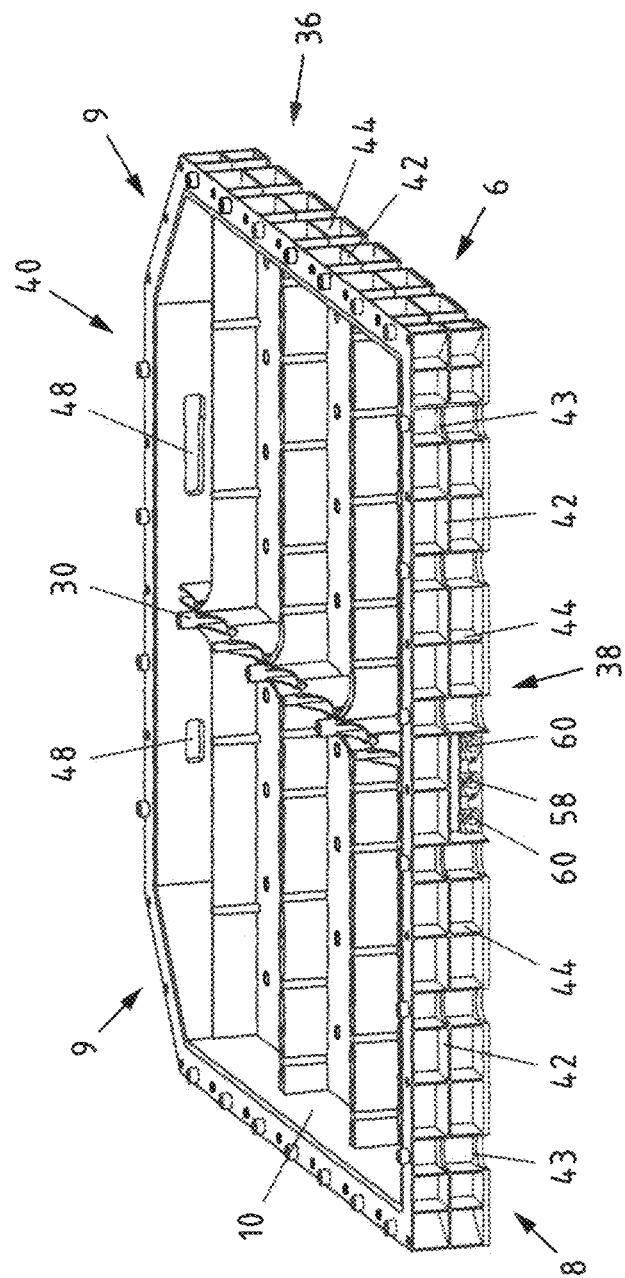
FIG. 7 a perspective rear view of the embodiment example of a battery carrier shown in FIG. 5.
Figure 8:
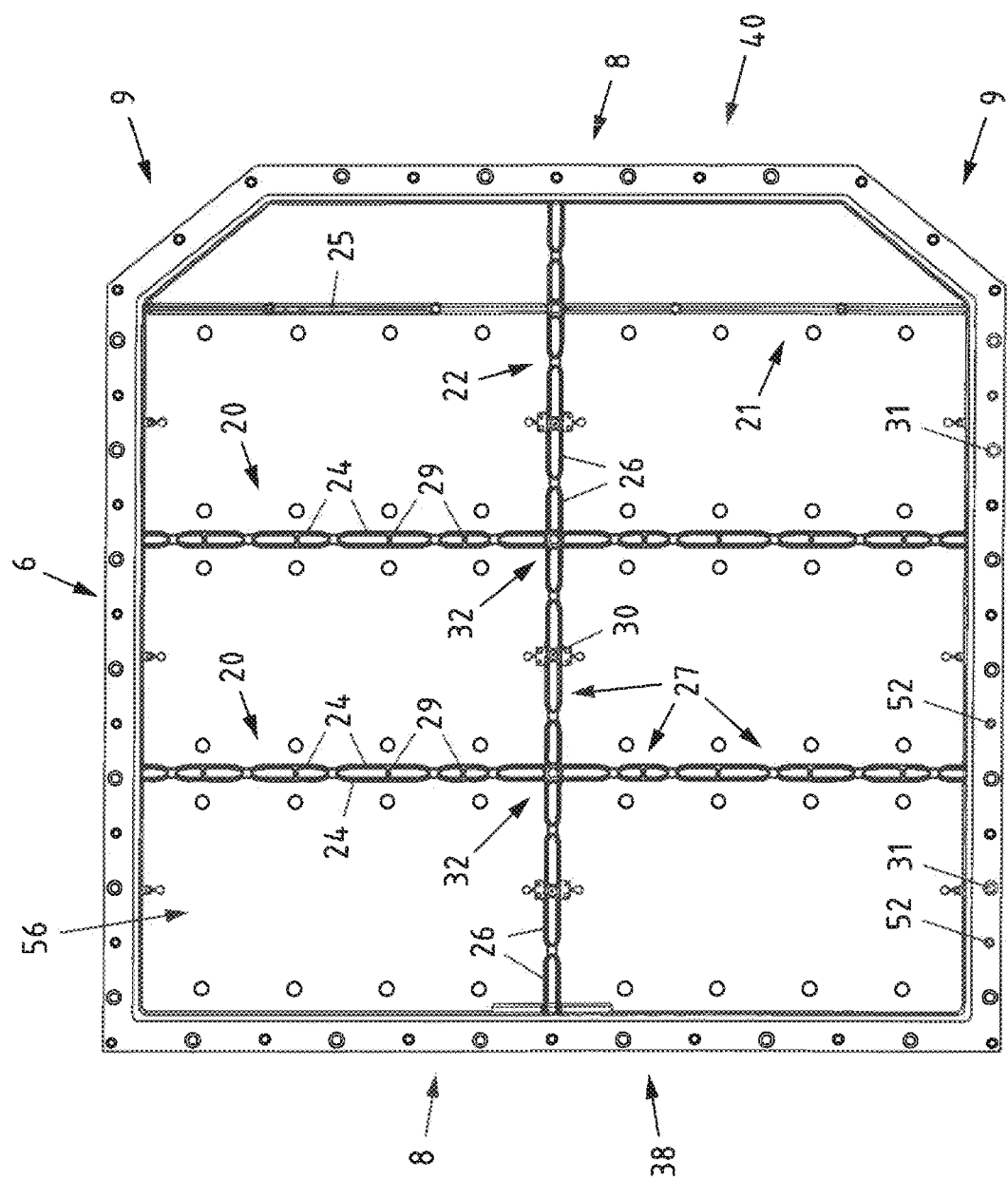
FIG. 8 a schematic top view of the embodiment example of a battery carrier shown in FIG. 5.

In the following description of the various embodiments according to the invention, components and elements with the same function and the same mode of operation are provided with the same reference signs, even if the components and elements may differ in their dimensions or shape in the various embodiments.

FIGS. 1 to 4 show schematic views of a first embodiment example of a battery carrier 2 for holding at least one battery module serving as a drive energy storage unit for an electrically powered vehicle.

The battery carrier 2 has a circumferential frame structure 4, wherein the circumferential frame structure 4 has two longitudinal sides 6 and two transverse sides 8. The battery carrier 2 is preferably cast in one piece from a light metal material, in particular from an aluminum alloy. Preferably, a receiving area 14 spanned between the inner sides 10 of the longitudinal sides 6 and the inner sides 12 of the transverse sides 8 has an area of at least 0.5 m2, in particular of at least 0.75 m2, particularly preferably of at least 1 m2. In this context, it is preferable if the longitudinal sides 6 have a length 16 of greater than 1 m, in particular greater than 1.2 m, particularly preferably greater than 1.5 m, and the transverse sides 8 have a length 18 of greater than 1 m, in particular greater than 1.25 m, particularly preferably greater than 1.4 m. Furthermore, curved transition areas 9 are arranged between the front transverse side 8 and the longitudinal sides 6.

Two transverse webs 20 run between the longitudinal sides 6 essentially parallel to the transverse sides 8. A longitudinal web 22 also runs between the transverse sides 8 essentially parallel to the longitudinal sides 6. The transverse webs 20 and the longitudinal web 22 each have two ribs 24 and 26 arranged next to each other (see in particular FIG. 4). The two ribs 24 and 26 arranged next to each other run essentially parallel to each other. The ribs 26 of the longitudinal web 22 are connected to each other at the top by means of a connecting web 28.

The transverse webs 20 and the longitudinal web 22 have a plurality of cylindrical connecting sections 30, two connecting sections 30 being arranged in intersection areas 32 between transverse webs 20 and longitudinal webs 22. A total of six sections 34 for supporting battery modules are formed by the transverse webs 20 and the longitudinal web 22.

It can be seen that the height of the transverse webs 20 varies along their longitudinal extension. In particular, the height of the transverse webs 20 is maximum in the connecting sections 30, whereby the height of the transverse webs 20 is minimum in the middle between the connecting sections 30, which are not arranged in the intersection area 32.

The outer sides of the transverse sides 8 have a profile structure 36 for stiffening the battery carrier 2. It can be seen that the transverse side 8 associated with a rear side 38 of the battery carrier 2 forms a honeycomb profile, whereas the transverse side 8 associated with a front side 40 of the battery carrier forms a box profile. The profile structures 36 are composed of horizontally extending profile webs 42, vertically extending profile webs 44 and/or substantially obliquely extending profile webs 46.

Furthermore, the battery carrier 2 has a plurality of openings 48 in the transverse sides 8, which can be used, for example, to connect cooling channels for cooling battery modules arranged in the battery carrier 2 and/or for the electrical connection of battery modules arranged in the battery carrier 2. In particular, the openings 48 are used for wiring the electrical system of the battery carrier 2.

In addition, thickenings 50 are arranged on the outside of the longitudinal sides 6 of the circumferential frame structure 4, which reinforce the frame structure 4 in the area of ejector markings 52. The six sections 34 have a circumferential edge 54, which serves to arrange the various battery modules in the sections 34.

FIGS. 5 to 9 show schematic views of a second embodiment example of a battery carrier 2 for holding at least one battery module serving as a traction energy storage unit for an electrically powered vehicle. In the following, the differences to the first embodiment example of the battery carrier 2 shown in FIGS. 1 to 4 will therefore be discussed in particular.

Figure 9:
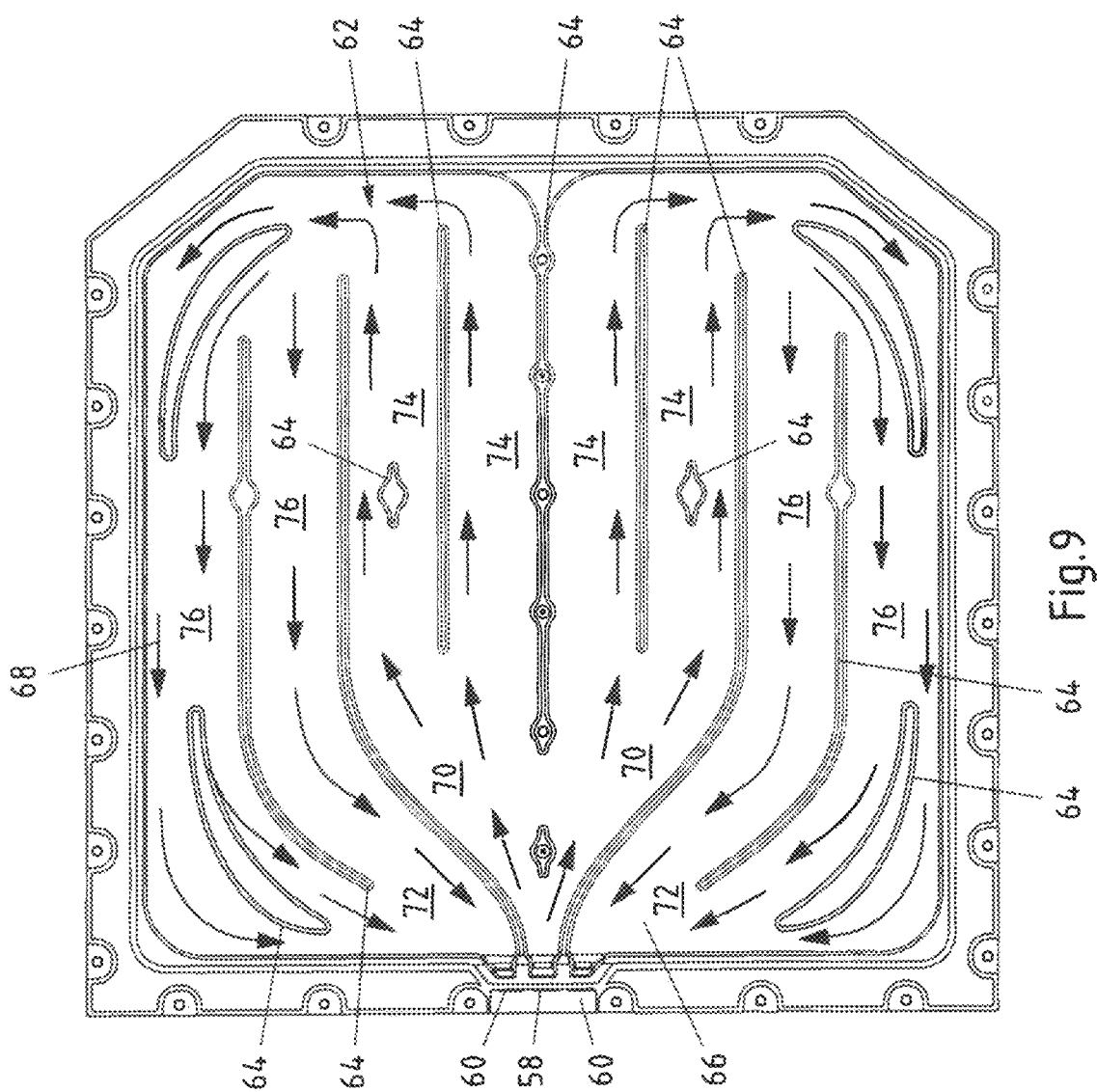
FIG. 9 a schematic view of the underside of the embodiment example of a battery carrier shown in FIG. 5.

The battery carrier 2 comprises a base 56, the base having cooling channels 62 connected to an inlet 58 and two outlets 60 (see in particular FIG. 9). The inlet 58 and the two outlets 60 are provided in a transverse side 8. The inlet 58 is arranged substantially centrally in the transverse side 8, the two outlets 60 being arranged laterally at a distance from the inlet 58.

Furthermore, the base 56 has a plurality of cooling webs 64 which divide the cooling channels 62 into substantially a first flow path 66 and substantially a second flow path 68. The first flow path 66 is fluidically connected to the inlet 58 and a first outlet 60, and the second flow path is fluidically connected to the inlet 58 and a second outlet 60.

In addition, the two flow paths each have an inlet area 70 extending from the inlet 58 to the opposite transverse side 8 and an outlet area 72 extending to the inlet area 70 from the opposite transverse side 8 to the outlets 60. The inlet areas 70 and the outlet areas 72 are each subdivided by cooling webs 64 into at least two inlet channels 74 extending substantially parallel to one another and two outlet channels 76 extending substantially parallel to one another.

The transition area 9 for connecting a longitudinal side 6 to the two transverse sides 8 is essentially straight in the present case, with the transition area 9 forming an angle of less than 180° with the two transverse sides 8 and the longitudinal side 6 on the inner side surfaces. As a result, the receiving area 14 in the transition area 9 is reduced in size.

In contrast to the embodiment example shown in FIGS. 1 to 4, the battery carrier 2 has a profile structure 36 on its entire circumferential frame structure 4. Accordingly, the profile structure 36 is also provided on the longitudinal sides 6 and in the transition area 9. In particular, the profile structure 36 is designed as a box profile comprising horizontally extending profile webs 42 and vertically extending profile webs 44. Furthermore, horizontal profile webs 43 are provided in particular below connecting sections 31 arranged on the circumferential frame structure 4.

Likewise, the profile structure 36 associated with the longitudinal sides 6 has essentially triangular and vertically extending reinforcing webs 45, each of which is associated with an ejector marking 52 of the circumferential frame structure 4.

The transverse webs 20 and 21 and the longitudinal web 22 each have two ribs 24, 25 and 26 arranged next to each other. It can be seen in particular from FIG. 8 that the ribs 24 of the transverse webs 20 and the ribs 26 of the longitudinal web 22 form O-shaped rib structures 27 arranged essentially one behind the other. The O-shaped rib structures 27 of the transverse webs 20 have a web 29 running centrally orthogonal to the longitudinal extension of the transverse webs 20.

In addition, the ribs 26 of the longitudinal web 22 have a varying height, the height of the longitudinal web 22 being maximum, in particular in the connecting sections 30, and the height of the ribs 26 of the longitudinal web 22 being minimum centrally between the connecting sections 30.

Furthermore, two openings 48 designed as elongated holes are provided on the front side 40 of the battery carrier 2, which can be used, for example, for the electrical connection of the battery modules arranged in the battery carrier 2 to the vehicle.

The exemplary embodiments/execution examples of the present invention described in this specification are to be understood as disclosed both individually and in all combinations with one another. In particular, the description of a feature encompassed by an embodiment—unless explicitly stated to the contrary—should not be understood herein to mean that the feature is indispensable or essential for the function of the embodiment. The sequence of the method steps described in this specification in the individual flowcharts is not mandatory; alternative sequences of the method steps are conceivable. The method steps can be implemented in various ways, for example implementation in software (by program instructions), hardware or a combination of both is conceivable for implementing the method steps.

Terms used in the claims such as "comprising", "comprising", "comprising", "containing" and the like do not exclude further elements or steps. The wording "at least partially" includes both the case of "partially" and the case of "completely". The wording "and/or" is to be understood as meaning that both the alternative and the combination are to be disclosed, i.e. "A and/or B" means "(A) or (B) or (A and B)". A plurality of entities, persons or the like in the context of this specification means a plurality of entities, persons or the like. The use of the indefinite article does not preclude a plurality. A single device may perform the functions of several units or devices mentioned in the claims. Reference signs given in the claims are not to be regarded as limitations of the means and steps used.

LIST OF REFERENCE SIGNS

2 Battery carrier
4 Frame structure

6 Longitudinal side
8 Transverse side
9 Transition area
10 Inner sides of the longitudinal sides
12 Inner sides of the transverse sides
14 Receiving area
16 Length of the longitudinal side
18 Length of the transverse side
20 Transverse web
22 Longitudinal web
24 Ribs of the transverse web
26 Ribs of the longitudinal web
27 O-shaped rib structures
28 Connecting web
29 Web
30 Connecting section of a transverse and longitudinal web
31 Connecting section of frame structure
32 Intersection area
34 Section for mounting a battery module
36 Profile structure
38 Rear side
40 Front side
42 Horizontal profile web
43 Horizontal, short profile bars
44 Vertical profile web
45 Triangular and horizontal reinforcing web
46 Angled profile web
48 Opening
50 Thickening
52 Ejector marking
54 Circumferential edge
56 Base
58 Inlet
60 Outlet
62 Cooling channel
64 Cooling web
66 First flow path
68 Second flow path
70 Inlet area
72 Outlet area
74 Inlet channel
76 Outlet channel

The invention claimed is:

1. A battery carrier for receiving at least one battery module serving as a drive energy storage device for an electrically driven vehicle, wherein the battery carrier is connected to a body of the vehicle, comprising:
a substantially circumferential frame structure having longitudinal sides and transverse sides for forming a receiving area for the at least one battery module,
wherein the receiving area includes an area of at least 0.5 m$^2$, and
wherein the battery carrier has at least one transverse web and/or at least one longitudinal web for stiffening the battery carrier and/or for connecting the battery carrier to the body of the vehicle,
wherein the battery carrier is cast in one piece from a light metal material, and
wherein the outer side of the circumferential frame structure has at least partially a profile structure for stiffening the battery carrier.

2. The battery carrier according to claim 1, wherein the at least one transverse web extends substantially parallel to at least one transverse side and/or the at least one longitudinal web extends substantially parallel to at least one longitudinal side.

3. The battery carrier according to claim 2, wherein at least two ribs, which are arranged substantially next to one another, form the at least one transverse web and/or the at least one longitudinal web.

4. The battery carrier according to claim 2, wherein at least one connecting section for connecting the battery carrier to the body of the vehicle is arranged in an intersection area of the at least one transverse web with the at least one longitudinal web.

5. The battery carrier according to claim 2, wherein the height of the at least one transverse web varies along the longitudinal extension of the at least one transverse web and/or the height of the at least one longitudinal web varies along the longitudinal extension of the at least one longitudinal web.

6. The battery carrier according to claim 5, wherein the at least one transverse web and/or the at least one longitudinal web have connecting sections for connecting the battery carrier to the body of the vehicle.

7. The battery carrier according to claim 1, wherein the profile structure comprises substantially horizontally extending profile webs and/or substantially vertically extending profile webs.

8. The battery carrier according to claim 7, wherein the length of the substantially horizontally extending profile webs varies relative to one another, and/or that the length of the substantially vertically extending profile webs varies.

9. The battery carrier according to claim 7, wherein the profile structure has substantially vertical reinforcing webs, the substantially vertical reinforcing webs being assigned to ejector markings of the circumferential frame structure.

10. The battery carrier according to claim 1, wherein the battery carrier further comprises a base.

11. The battery carrier according to claim 10, wherein the circumferential frame structure has at least one inlet and/or at least one outlet, and the at least one inlet and/or the at least one outlet is/are fluidically connected to the cooling channels arranged in the base for circulation of coolant in the cooling channels.

12. The battery carrier according to claim 11, wherein a first transverse side has at least one inlet arranged centrally and two outlets arranged laterally to the inlet, and wherein cooling webs are arranged in the base and divide the cooling channels into at least one substantially first flow path and a substantially second flow path, such that the first flow path is fluidically connected to the inlet and a first outlet, and the second flow path is fluidically connected to the inlet and a second outlet.

13. The battery carrier according to claim 12, wherein the first flow path and/or the second flow path has an inlet area extending from the inlet arranged on the first transverse side to the second transverse side and an outlet area adjoining the inlet area and extending from the second transverse side to the first outlet and/or the second outlet.

14. The battery carrier according to claim 1, wherein the battery carrier is cast in one piece from an aluminum alloy; and the aluminum alloy is a cast aluminum alloy of the 4000 series, a cast aluminum alloy of the 5000 series, or an aluminum alloy of the 7000 series; and/or the aluminum alloy has the following composition in % by weight:

| | |
|---|---|
| Mg | 3.4 to 4.6; |
| Fe | 1.3 to 1.7; |
| Si | ≤0.2; |
| Cu | ≤0.2; |
| Mn | ≤0.15; |

-continued

| | |
|---|---|
| Zn | ≤0.3; |
| Ti | ≤0.2; | and the balance being Al and unavoidable impurities; or the aluminum alloy has the following composition in % by weight:

| | |
|---|---|
| Si | 8.5 to 10.5; |
| Mn | 0.3 to 0.6; |
| Fe | ≤0.15; |
| Cu | ≤0.05; |
| Mg | ≤0.1; |
| Zr | ≤0.3; preferably 0.1 to 0.3; |
| Zn | ≤0.05; |
| Ti | ≤0.15; |
| Sr | ≤0.03; |
| V | ≤0.1; | and the balance being Al and unavoidable impurities.

15. A method for die-casting a substantially one-piece battery carrier according to claim 1, from a light metal melt comprising the following steps:

forming a mold cavity, at least two mold parts being moved to form the mold cavity in such a way that the at least two mold parts lie sealed to one another, a blast area formed at least partially by the mold cavity having at least 0.5 m$^2$;

filling the molten light metal into the mold cavity by means of a gating system;

keeping the mold cavity closed with a closing force of at least 4000 metric tons until the molten light metal filled into the mold cavity has substantially solidified; and opening the mold cavity and removing the battery carrier formed in the mold cavity.

16. The battery carrier according to claim 3, wherein the at least two ribs are arranged relative to one another in such a way that the transverse web and/or the longitudinal web has a plurality of O-shaped rib structures.

17. The battery carrier according to claim 4, wherein the at least one connecting section is formed substantially cylindrical in shape.

18. The battery carrier according to claim 7, wherein the substantially horizontally and/or vertically extending profile webs substantially form a box profile or a honeycomb profile.

19. The battery carrier according to claim 10, wherein the base comprises cooling channels for cooling battery modules accommodated in the battery carrier.

20. The battery carrier according to claim 13, wherein the inlet area comprises two inlet channels extending at least partially substantially parallel to one another and/or the outlet area comprises two outlet channels extending at least partially substantially parallel to one another.

\* \* \* \* \*